United States Patent [19]

Wade

[11] Patent Number: 5,067,107
[45] Date of Patent: Nov. 19, 1991

[54] CONTINUOUS COMPUTER PERFORMANCE MEASUREMENT TOOL THAT REDUCES OPERATING SYSTEM PRODUCED PERFORMANCE DATA FOR LOGGING INTO GLOBAL, PROCESS, AND WORKLOAD FILES

[75] Inventor: Gerald T. Wade, Auburn, Calif.

[73] Assignee: Hewlett-Packard Company, Palo Alto, Calif.

[21] Appl. No.: 229,573

[22] Filed: Nov. 5, 1988

[51] Int. Cl.$^5$ .................. G06F 11/34; G06F 7/14; G06F 15/401

[52] U.S. Cl. .................. 395/500; 364/264.7; 364/260.9; 364/260.4; 364/280; 364/275.5; 364/276; 364/264; 364/920; 364/921.8; 364/921.91; 364/974; 364/976; 364/951.1; 364/949.5; 364/DIG. 1; 364/DIG. 2

[58] Field of Search ... 364/200 MS File, 900 MS File, 364/300 MS File, 550, 551.01, 554, 570, 579, 580; 371/16, 17, 19, 29.1, 21.6, 16.5

[56] References Cited

U.S. PATENT DOCUMENTS

| | | | |
|---|---|---|---|
| Re. 31,407 | 10/1983 | Furtman | 364/200 |
| 3,763,474 | 10/1973 | Freeman | 364/200 |
| 4,015,238 | 3/1977 | Davis | 371/43 |
| 4,231,106 | 10/1980 | Heap et al. | 364/900 |
| 4,315,311 | 2/1982 | Causse et al. | 364/200 |
| 4,322,846 | 3/1982 | Carroll et al. | 371/16 |
| 4,367,525 | 1/1983 | Brown | 364/200 |
| 4,574,351 | 3/1986 | Dang et al. | 364/200 |
| 4,606,024 | 8/1986 | Glass et al. | 371/16 |
| 4,618,937 | 10/1986 | Elias | 364/413.01 |
| 4,621,319 | 11/1986 | Braun | 364/200 |
| 4,713,758 | 12/1987 | De Kelaita et al. | 364/200 |
| 4,713,775 | 12/1987 | Scott | 364/513 |
| 4,724,525 | 2/1988 | Purcell | 364/56 |
| 4,730,259 | 3/1988 | Gallant | 364/513 |
| 4,748,573 | 5/1988 | Sarandrea et al. | 364/551 |
| 4,750,106 | 6/1988 | Aiken | 364/200 |
| 4,750,175 | 6/1988 | Brenneman et al. | 371/22 |
| 4,771,375 | 9/1988 | Beglin | 364/200 |
| 4,803,683 | 2/1989 | Mori et al. | 371/19 |
| 4,829,471 | 5/1989 | Banerjee | 364/900 |
| 4,833,594 | 5/1989 | Familetti | 364/200 |
| 4,835,680 | 5/1989 | Hogg | 364/200 |
| 4,843,575 | 6/1989 | Crane | 364/550 |
| 4,849,879 | 8/1989 | Chinnaswamy | 364/200 |
| 4,858,152 | 8/1989 | Estes | 364/138 |
| 4,922,491 | 5/1990 | Coale | 371/29.1 |
| 4,937,864 | 6/1990 | Caseiras | 364/186 |
| 4,964,129 | 10/1990 | Bowden | 371/21.6 |

*Primary Examiner*—Thomas C. Lee
*Assistant Examiner*—Eric Coleman

[57] ABSTRACT

A performance and measurement system for a computing system is presented. Performance data produced by the computing system is collected and reduced before being logged. Once the data is logged, the data may be transported to a workstation and accessed by a user.

In the preferred embodiment, the collected and reduced data is logged into three files. The first file is a global data file into which is logged information about the computing system as a whole. The second file is a process data file into which is logged information about selected processes. The third file is a workload data file into which is logged information about classes of processes.

Information about processes are logged into the process data file when a process does something "interesting" during a specified interval. For example, a process may be considered to have done something interesting when the process is started, is terminated or uses a predetermined amount of a computing system resource during the specified interval.

1 Claim, 2 Drawing Sheets

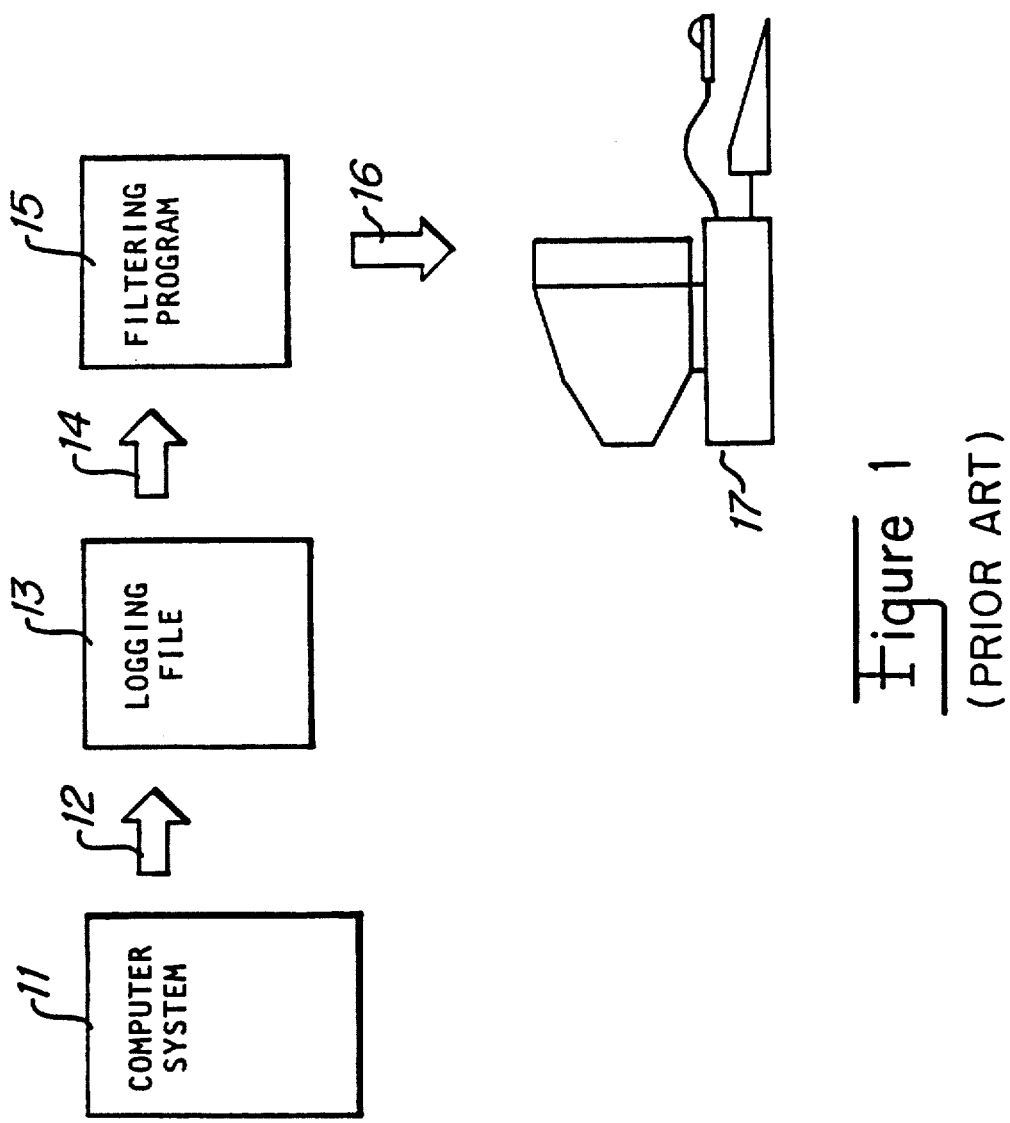

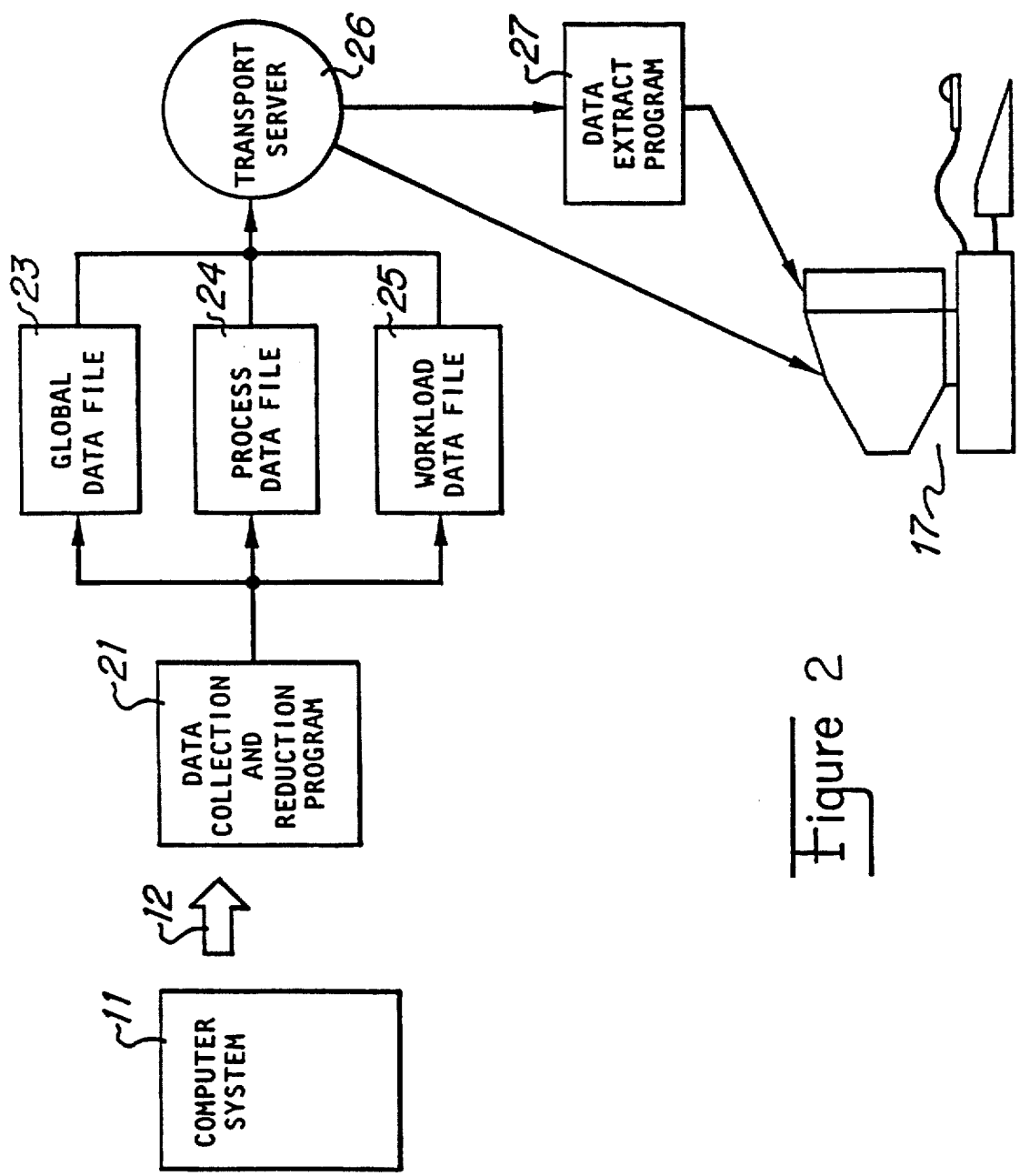

CONTINUOUS COMPUTER PERFORMANCE MEASUREMENT TOOL THAT REDUCES OPERATING SYSTEM PRODUCED PERFORMANCE DATA FOR LOGGING INTO GLOBAL, PROCESS, AND WORKLOAD FILES

BACKGROUND

The present invention relates to the measurement of computer performance.

Performance tools are used to measure the performance of a computer. The performance of a computer may be evaluated for a variety of purposes. For instance, it may be desired to make a "quick scan" of a computer system. What is meant by a quick scan is an examination of what is currently happening on the computer system in "real time". A quick scan may be done, for instance, when system performance is poor and it is desired to identify which processes are utilizing which computer resources and thus causing the poor performance.

Alternately, a determination of the "state of the system" may be done in order to evaluate the total resource utilization of the system. Such a determination may be done to discover which resources cause slow downs or bottlenecks in system performance. Once identified these resources may be upgraded to improve system performance.

Another reason for evaluating computer performance may be for "application tuning", that is to focus on a particular user application or situation to determine how to improve system performance as regards that particular application or situation.

Finally, performance tools may be used for "trouble shooting", that is determining why system performance degrades for no immediately apparent reason.

In the prior art, performance tools have been written for sophisticated computer technicians to aid in trouble shooting. The general philosophy has been the more data that is generated the better. When these performance tools have been adapted for other uses such as for quick scans, determination of the state of the system or for application tuning, the performance tools have generated too much information. This information is often incomprehensible to the average computer user.

In some system attempts have been made to arrange and to present gathered data in some form which may be deciphered by a user. However, such systems have not proved practical for gathering and presenting data for system performance over a long period of time. This is because the programs typically log an immense amount of information, before the information is later reduced. The memory resources required for such data logging are inordinate. A typical prior art performance system may log one hundred twenty million bytes in a typical twenty-four hour period. Not only is this burdensome on memory resources, but it also takes a lot of processing power to generate this information and then to manipulate this data into a form which is useful to a user.

SUMMARY OF THE INVENTION

In accordance with the preferred embodiments of the present invention a performance and measurement system for a computing system is presented. Performance data produced by the computing system is collected and reduced before being logged. Once the data is logged, the data may be transported to a workstation and accessed by a user.

In the preferred embodiment, the collected and reduced data is logged into three files. The first file is a global data file into which is logged information about the computing system as a whole. The second file is a process data file into which is logged information about selected processes. The third file is a workload data file into which is logged information about classes of processes.

Information about processes are logged into the process data file when a process does something "interesting" during a specified interval. For example, a process may be considered to have done something interesting when the process is started, is terminated or uses a predetermined amount of a computing system resource during the specified interval.

Data volume is reduced by combining available system performance numbers into standard metrics (See Appendix B for examples of standard metrics). By performing this reduction prior to logging the data, significant savings in log file space are achieved. Contrary to expectations, the pre-reduction of data before logging results in less overhead than that which is required to log the data without pre-reduction. Choice of standard performance metrics may be made so that they are understandable to a user and not specific to a particular computing system.

By selecting to log information only about "interesting" processes, the amount of information logged also is greatly reduced. Since many of a system's processes are dormant or almost dormant at any one time, logged information about these processes would be of little interest when studying the performance of a computing system.

BRIEF DESCRIPTION OF THE DRAWINGS

FIG. 1 is a block diagram representation of typical prior system used for evaluating computer performance.

FIG. 2 is a block diagram of a system for computer performance measurement and evaluation in accordance with the preferred embodiment of the present invention.

DESCRIPTION OF THE PREFERRED EMBODIMENT

In FIG. 1 a block diagram of a typical prior art computer performance system is shown. A computer system 11 produces performance data 12 which is logged in a logging file 13. When a user wishes to examine system performance, data 14 is transferred from logging file 13 to a filtering program 15. Filtering program 15 arranges the data in a prescribed format and forwards filtered data 16 to a user workstation 17 for evaluation by the user.

FIG. 2 shows a computer performance measurement and evaluation system in accordance with the preferred embodiment of the present invention. Computer system 11 is again shown producing performance data 12. This information is selectively collected and reduced to standard metrics by data collection and reduction program 21. For an example of standard metrics see Appendix B.

The most commonly used techniques for producing performance data are (1) Sampling, (2) Tracing and (3) Counting. When sampling takes place, computing system 11 is periodically interrupted and the current status of the system is determined. This provides snapshots of the system which may be statistically analyzed to evaluate the system performance.

Tracing is done by the insertion of code into the operating system of computing system 11 which causes the recording of key events. Typically each record of a key event will include a time stamp showing precisely when the event occurred. For example, if the initialization of a process and the termination of a process are recorded as key events, it is possible to determine how long the process was running.

Counting is done by the insertion of code into the operating system, much like tracing. The difference is that the inserted code increments a pre-defined accumulator or accumulates elapsed time into such an accumulator each time an event occurs, rather than recording the event itself.

Data collection and reduction program 21 receives the produced data 12 and will reduce the data before any logging takes place. Program 21 groups the reduced data into three groups and logs different details for each group. The first group is global data logged in global data file 23. The second group is process data logged in process data file 24. The third group is workload data logged in workload data file 25.

Global data in global data file 23 consists of global data records of standard metrics which report system performance on computing system 11 as a whole. Records are added to this file, for example, at the rate of one every five minutes.

Process data in process data file 24 consists of process data records of standard metrics which contains information on any process which is found to be "interesting" during a specified interval. Specified interval is, for example, one minute. Records are typically added to process data file 24 at the end of each specified interval. A process is found to be "interesting when it meets any one (or more) of the following criteria:

A process is seen for the first time, i.e., it is started.

A process ceases to run, i.e., it is terminated.

A process uses more of a given resource than a user defined threshold value. For instance, thresholds may be set for (1) central processing unit (CPU) usage, (2) amount a disc drive is accessed, (3) amount of transactions with a terminal and (4) the amount of response time between the process and a terminal.

Workload data in workload data file 25 consists of records containing information for any user defined grouping or processes. Such a grouping is called a "class". For example, information about a class may be logged once every five minutes when at least one process within the class consumes some CPU time during the five minutes. An extensive level of detail may be logged about a class of processes where it would be impractical to log such a level of detail for each process.

In the preferred embodiment, a user may specify whether to log global, process and workload data independently or in any combination. A user also may set the amount of disc space the user is willing to consume to hold data of each type. Global data file 23, process data file 24 and workload data file 25 are "circular", that is when each file is filled new data overwrites the oldest data in the file.

Table 1 below presents a "pseudo code" version of data collection and reduction program 21.

TABLE 1

INITIALIZE (Verify execution environment and initialize counters)

TABLE 1-continued (Open global data file 23, process data file 24, workload data file 25)
READ USER DEFINABLE PARAMETERS (System Identification, Thresholds, Application Definitions)
BEGIN (Continuous Loop)
   GATHER SYSTEM GLOBAL INFORMATION
   (From Operating System)
   COMBINE RAW GLOBAL DATA INTO STANDARD
   GLOBAL METRICS
   BEGIN (For each potential Process)
      GATHER PROCESS INFORMATION (From
      Operating System)
      ACCUMULATE PROCESS INFORMATION INTO
      STANDARD GLOBAL METRICS
      IF THIS IS A NEW PROCESS THEN
         MARK THE PROCESS AS "INTERESTING"
         DETERMINE APPLICATION # FROM USER
         DEFINITIONS
      IF THIS PROCESS JUST TERMINATED THEN
         MARK THE PROCESS AS "INTERESTING"
      IF THIS PROCESS EXCEEDED ANY USER
      DEFINED THRESHOLDS
         (CPU%, DISC IO RATE, TRANSACTION
         RATE, RESPONSE TIME)
         MARK THE PROCESS AS "INTERESTING
      ACCUMULATE PROCESS INFORMATION
         INTO CORRESPONDING APPLICATION'S
         STANDARD METRICS AND MARK THE
         APPLICATION AS "ACTIVE"
      IF THE PROCESS IS MARKED "INTERESTING"
         THEN COMBINE RAW PROCESS DATA INTO
         STANDARD PROCESS METRICS
         LOG THE PROCESS METRICS INTO process
         data file 24.
   END
   IF THE DESIRED GLOBAL INTERVAL HAS PASSED
      THEN LOG THE GLOBAL METRICS INTO global
      data file 23.
   FOR EACH USER DEFINED APPLICATION
      IF APPLICATION IS MARKED AS "ACTIVE"
         THEN LOG THE APPLICATION METRICS
         INTO workload data file 25.
         INITIALIZE APPLICATION COUNTERS
   PAUSE UNTIL TIME TO COLLECT NEXT DATA
END In order to present the collected data to a user, it is necessary to transport the data from files 23, 24 and 25 to user workstation 17. This may be done by a transport server 26. Transport server 26 may deliver the data to user workstation 17, for instance by a local area network (LAN) or an RS-232 data communication link. A data extract program 27 may be used to extract data from computers on a network which user workstation is not directly a part of.

Appendix A contains a description of a user interface for the computer performance and evaluation system of FIG. 2.

Appendix B contains an listing of standard performance metrics which may be logged into global data file 23, process data file 24 and workload data file 25.

I claim:

1. A performance and measurement system embedded within a computing system for measuring performance of the computing system, the performance and measurement system comprising:
   performance data production means within an operating system of the computing system for producing performance data;
   at least one data file; and
   data collection and reduction means, coupled to the performance data production means and to the at least one data file, for receiving the performance data, reducing the performance data into standardized metrics to produce reduced data, and logging the reduced data into the at least one data file; and
wherein said at least one data file comprises
- a global data file into which said data collection and reduction means logs information about the computing system as a whole;
- a process data file into which said data collection and reduction means logs information about selected processes selected by the data collection and reduction means, wherein said selected processes include processes which during a specified interval are terminated, and processes which during a specified interval use at least a predetermined amount of a given resource of the computing system; and
- a workload data file into which said data collection and reduction means logs information about classes of processes.

* * * * *